United States Patent
Haggans et al.

Patent Number: 6,058,231
Date of Patent: May 2, 2000

[54] BORON-DOPED OPTICAL FIBER

[75] Inventors: Charles W. Haggans; Wayne F. Varner, both of Woodbury, Minn.; Jau-Sheng Wang, West Haven, Conn.

[73] Assignee: 3M Innovative Properties Company, St. Paul, Minn.

[21] Appl. No.: 09/023,626

[22] Filed: Feb. 13, 1998

[51] Int. Cl.⁷ .................................................... G02B 6/34
[52] U.S. Cl. .............................. 385/37; 385/142; 385/144
[58] Field of Search ............................. 385/37, 142, 144, 385/123

[56] References Cited

U.S. PATENT DOCUMENTS

| | | | |
|---|---|---|---|
| 4,842,405 | 6/1989 | El-Sherif | 350/320 |
| 5,235,659 | 8/1993 | Atkins et al. | 385/124 |
| 5,367,588 | 11/1994 | Hill et al. | 385/37 |
| 5,627,933 | 5/1997 | Ito et al. | 385/123 |
| 5,647,040 | 7/1997 | Modavis et al. | 385/42 |
| 5,805,751 | 9/1998 | Kewitsch et al. | 385/43 |
| 5,881,197 | 3/1999 | Dong et al. | 385/127 |

FOREIGN PATENT DOCUMENTS

| | | | |
|---|---|---|---|
| 0 668 514 A2 | 8/1995 | European Pat. Off. | G02B 6/12 |
| WO 93/18420 | 9/1993 | WIPO | G02B 6/16 |
| WO 94/00784 | 1/1994 | WIPO | G02B 6/16 |

OTHER PUBLICATIONS

Boj S. Delevaque et al., "Optical Fiber Design for Strong Gratings Photoimprinting with Radiation Mode Suppression", Postdeadline Paper presented at the Optical Fiber Conference in San Diego, California; (OFC '95), Feb. 1995.

L. Dong et al., "Optical Fibers with Depressed Claddings for Suppression of Coupling into Cladding Modes in Fiber Bragg Gratings", *IEEE Photonics Technology Letters*, vol. 9, No. 1, Jan. 1997, pp. 64–66.

E .J. Friebele et al., "Radiation–induced Attenuation in Polarization Maintaining Fibers: Low Dose Rate Response, Stress, and Materials Effects", *Applied Optics*, vol. 28, No. 23, Dec. 1, 1989, pp. 5138–5142.

S. J. Hewlett, et al., "Coupling characteristics of Photo–induced Bragg Gratings in Depressed– and Matched–cladding Fibre", *Optical and Quantum Electronics*, 28 (1996), pp. 1541–1654.

QPS Technology Inc., "Fiber for Bragg Gratings", QPS–PFBG–152–R, Release 1, Aug. 1996.

QPS Technology Inc., "Fiber for Bragg Gratings", QPS–PFBG–1355–T, Release 2, Aug. 1996.

*Primary Examiner*—Hung N. Ngo
*Attorney, Agent, or Firm*—Néstor F. Ho; Dorothy P. Whelan

[57] ABSTRACT

A single-mode optical fiber that includes: (a) a core that includes silica and is characterized by a first refractivity that changes upon exposure to actinic radiation of a predetermined wavelength; and (b) a cladding surrounding the core that also includes silica and is characterized by a second refractivity different from the first refractivity that changes upon exposure to actinic radiation of a predetermined wavelength. At least one of the core and the cladding further includes boron, the relative amounts of boron in the core and cladding being selected such that the first refractivity and the second refractivity change by substantially the same amount upon exposure to actinic radiation of a predetermined wavelength.

27 Claims, 1 Drawing Sheet

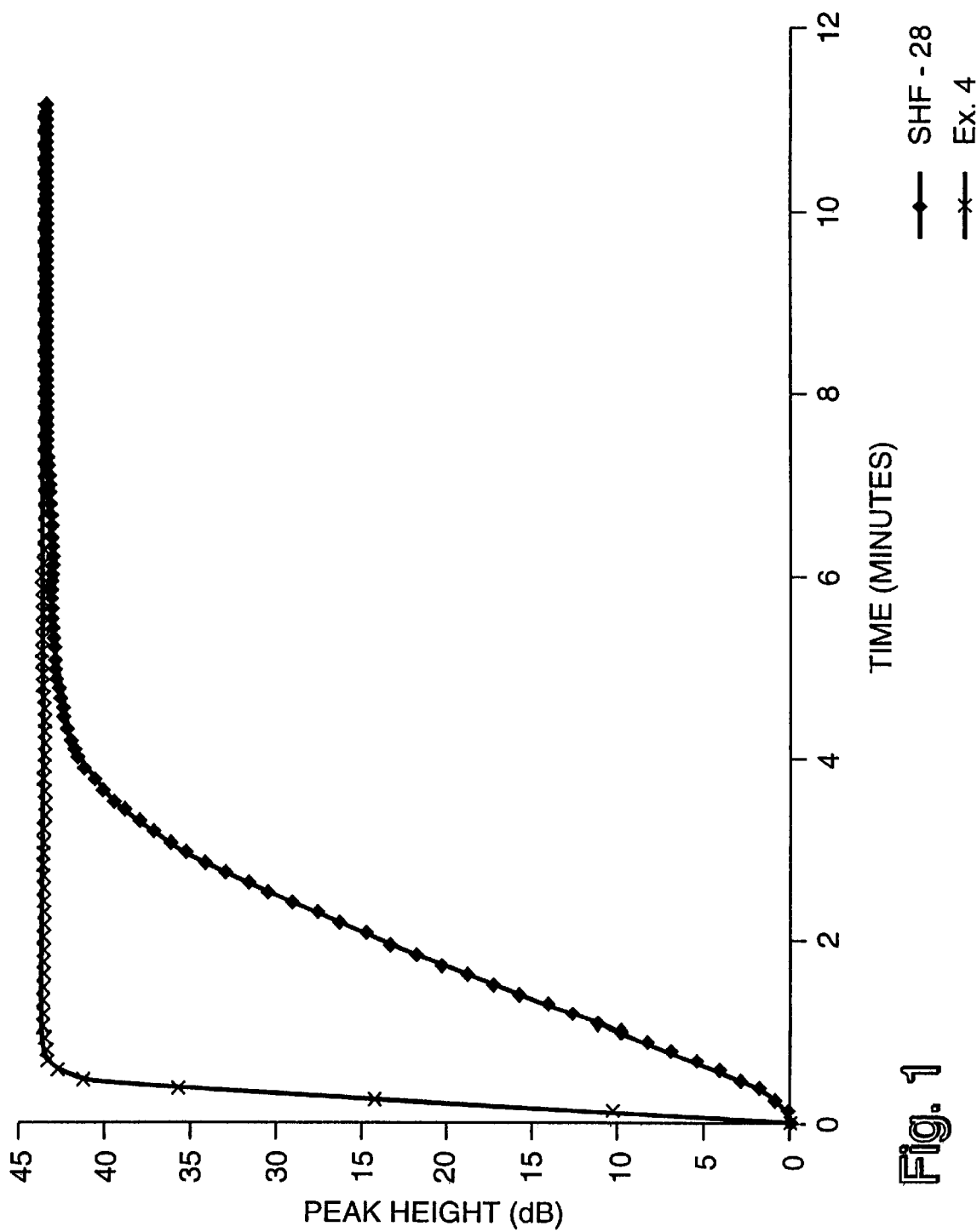

BORON-DOPED OPTICAL FIBER

BACKGROUND OF THE INVENTION

This invention relates to preparing optical fibers having optical properties that can be changed by exposure to actinic radiation.

Optical fibers feature a core that guides the light and a cladding that confines the light. The performance of the fiber as an optical waveguide depends on the core and cladding refractivities which are controlled through the choice of materials used to fabricate the core and cladding.

Optical fibers are made primarily of ultrapure silica. Often, the fibers are doped to render them photosensitive. The property of photosensitivity permits photoinducing permanent changes in the fiber's refractivity after it has been fabricated such that optical devices are created in the fiber. Examples of such optical devices include Bragg gratings used to reflect certain wavelengths.

The reflectivity of a photoinduced Bragg grating depends on the fiber's photosensitivity and the time of exposure to the photoinducing light. Photosensitivity can be increased by using high concentrations of traditional dopants, e.g. germanium, but this has the disadvantage of reducing the diameter of the light travelling in the fiber, thereby causing signal loss via scattering at splices between photosensitive and industry standard fibers. Alternatively, low concentrations of traditional dopants and long exposure times can be used, but this is often impractical or results in gratings that are only moderately reflective.

Another source of signal loss in fibers containing Bragg gratings is the interaction between the light in the core and light in the cladding. Interference between light propagating through a core with a photoinduced grating and light in an unaltered cladding causes scattering of light and leads to significant signal loss out the side of the fiber (also known as "cladding mode losses"). Even in fibers containing photoinduced gratings in both the core and the cladding, significant side losses can result due to interference.

SUMMARY OF THE INVENTION

In one aspect, the invention features a single-mode optical fiber with a core and a cladding surrounding the core. The core includes silica and is characterized by a first refractivity that changes upon exposure to actinic radiation of a predetermined wavelength. The cladding also includes silica and is characterized by a second refractivity, different from the first refractivity, that also changes upon exposure to actinic radiation of a predetermined wavelength. At least one of the core and the cladding further includes boron. The relative amounts of boron in the core and cladding are selected such that the first refractivity and the second refractivity change by substantially the same amount upon exposure to actinic radiation of a predetermined wavelength. For example, the ratio of the refractivity change in the cladding relative to that of the core ranges from about 0.50 to about 1.50, more preferably from about 0.8 to about 1.1. The actinic radiation preferably is ultraviolet radiation.

The core, the cladding, or both include boron. In the case where the core includes boron, the boron concentration preferably ranges from about 3–10 mole %. Where the cladding includes boron, the boron concentration preferably ranges from 3–15 mole %. These amounts are calculated based upon $B_2O_3$. Other elements that may be present in the core to achieve waveguiding include germanium, phosphorus, and combinations thereof. Other elements that may be present in the cladding include germanium, phosphorus, and combinations thereof.

Single-mode fibers are characterized by their mode field diameter. The mode field diameter is a function of the core diameter and the refractivities of the core and cladding. When two single-mode fibers with different mode field diameters are spliced together, some light energy is lost due to reflection when the light travels through the splice. Single-mode fibers commonly used in the telecommunications industry have a mode field diameter of about 10.5 micrometers. Accordingly, the optical fiber preferably has a mode field diameter of about 8–12 micrometers to avoid splice losses.

In a second aspect, the invention features a single-mode optical fiber with a core and a cladding surrounding the core. The core includes silica and has a Bragg grating that includes a first repetitive pattern of perturbations in the refractivity of the core along the axial direction of the optical fiber. The repetitive pattern, in turn, is characterized by an amplitude, period, and phase. The change in refractivity of the core upon exposure to actinic radiation is a measure of the amplitude of the Bragg pattern.

The cladding also includes silica and has a Bragg grating that includes a repetitive pattern of perturbations in the refractivity of the cladding along the axial direction of the optical fiber. This repetitive pattern is also characterized by an amplitude, period, and phase. The change in refractivity of the cladding upon exposure to actinic radiation is a measure of the amplitude of the Bragg pattern.

At least one of the core and cladding contains boron. The relative amounts of boron in the core and cladding are selected such that the amplitude, period, and phase of the Bragg grating associated with the core are substantially the same as the amplitude, period, and phase of the Bragg grating associated with the cladding.

The core, the cladding, or both include boron. In the case where the core includes boron, the boron concentration preferably ranges from about 3–10 mole %. Where the cladding includes boron, the boron concentration preferably ranges from 3–15 mole %. The percentages are calculated based upon $B_2O_3$. Other elements that may be present in the core to achieve waveguiding include germanium, phosphorus, and combinations thereof. Other elements that may be present in the cladding include germanium, phosphorus, and combinations thereof. The fiber preferably has a mode field diameter of about 8–12 micrometers.

Bragg gratings selectively reflect radiation within a limited range of wavelengths propagating in the fiber and are used to separate different signals transmitted simultaneously on different wavelengths. It is often desirable to have a highly reflective grating (i.e., a "strong" grating) in order to effectively separate different wavelengths. The reflectivity of the grating depends on the amplitude of the refractivity perturbations in the fiber. In one embodiment of the invention, the amplitudes of the repetitive patterns of refractivity perturbations in the core and cladding are greater than about 0.0008, again using the change in refractivities as a measure of the respective amplitudes.

In one embodiment, the Bragg gratings in the core and cladding selectively reflect wavelengths falling within a reflection band (also referred to herein as the peak width) defined by a first limiting wavelength and a second limiting wavelength that differ by at least about 0.5 nanometers. For all wavelengths within the reflection band, the transmitted optical power is at least about 20 dB lower than the power transmitted in the light of the corresponding wavelength which is incident on the grating, and for at least one wavelength in the reflection band the transmitted optical power is at least about 40 dB lower than the power transmitted in the light of the corresponding wavelength which is incident on the grating.

In another embodiment, the Bragg gratings in the core and cladding selectively reflect wavelengths falling within a reflection band (also referred to herein as the peak width) defined by a first limiting wavelength and a second limiting wavelength that differ by at least about 0.5 nanometers. For all wavelengths within the reflection band, the transmitted optical power is at least about 3 dB lower than the power transmitted in the light of the corresponding wavelength which is incident on the grating, and for at least one wavelength in the reflection band the transmitted optical power is at least about 10 dB lower than the power transmitted in the light of the corresponding wavelength which is incident on the grating.

In a third aspect, the invention features a method for modifying an optical fiber by exposure to actinic radiation of a predetermined wavelength in order to create a Bragg grating in both the core and cladding of the fiber. Either the fiber's core or cladding, or both, contain boron, with the relative amount of boron in the core and cladding being selected such that the refractivities of the core and cladding change by substantially the same amount upon exposure to the actinic radiation.

Preferably, the Bragg gratings are created in the fiber upon actinic radiation exposure for not more than about one minute. The fiber may be immersed in a hydrogen atmosphere prior to exposure to the actinic radiation.

The invention provides boron-doped single-mode fibers that, through careful selection of the relative amounts of boron in the core and cladding, have a core and cladding with substantially matched photosensitivity such that the refractivities of the core and cladding change by substantially the same amount upon exposure to actinic radiation. The fibers exhibit fast writing speeds combined with minimal side losses.

Other features and advantages of the invention will be apparent from the following description of the preferred embodiments thereof, and from the claims.

DESCRIPTION OF THE DRAWING

FIG. 1 is a plot of peak height (dB) versus time for a boron-doped fiber and a fiber without boron doping.

DETAILED DESCRIPTION

Preferred optical fibers have silica-based cores and claddings. The core and cladding are preferably doped to alter their properties. Specifically, the core, the cladding, or both are doped with boron to alter their refractivities. The relative boron dopant levels in the core and cladding are adjusted such that, upon exposure to actinic radiation such as ultraviolet radiation, the refractivities of the core and cladding change by substantially the same amount. This feature is particularly useful when writing Bragg gratings in the core and cladding. The boron level in the core is preferably about 3–10 mole percent, while the boron level in the cladding is preferably about 3–15 mole percent, calculated based upon $B_2O_3$.

The core, the cladding, or both may contain additional dopants as well. Examples include germanium ($GeO_2$), phosphorus ($P_2O_5$), and combinations thereof. Germanium and phosphorus increase the refractivity of the material, while boron decreases the refractivity. The relative amounts of dopants in the core and cladding are generally selected such that the refractivity of the core is about 1.4492 and the refractivity of the cladding is about 1.4446 at a wavelength of 1550 nm.

The doped optical fiber may be produced using a variety of known methods. Examples include the outside vapor deposition (OVD) method, the modified chemical vapor deposition (MCVD) method (described in MacChesney et al., Am. Ceram. Soc. Bull. 52:704 (1973)), and the vapor axial deposition (VAD) method, with the MCVD method being preferred.

Following production, the fiber is exposed to actinic radiation to write Bragg gratings in both the core and the cladding. The gratings are written into the core and cladding using the phase mask method described in Hill et al., U.S. Pat. No. 5,367,588, which is hereby incorporated by reference. According to this method, the Bragg grating is written in the core and cladding using a silica glass phase grating mask held in close proximity to the optical fiber. Laser irradiation (e.g., using an excimer laser) of the phase mask with, e.g., ultraviolet radiation at normal incidence photo-induces into the core and cladding the interference pattern created by the phase mask, resulting in creation of the Bragg gratings. The length of the grating and dosage (i.e., the cumulative energy per unit volume) can be adjusted to control peak width. Prior to writing the Bragg grating, the fiber may be immersed in a hydrogen atmosphere to increase its photosensitivity, as described in Atkins et al., U.S. Pat. No. 5,235,659, which is hereby incorporated by reference.

The invention will now be described further by way of the following examples.

EXAMPLES

Examples 1–4

These examples describe the preparation of boron-doped optical fibers in which the core and cladding have substantially matched photosensitivities, as measured by the ratio of the refractivity change in the cladding relative to that of the core. The fibers were single mode, silica-based, optical fibers having an outer diameter of 125 microns prepared using the MCVD method. The composition of each fiber, measured by x-ray wavelength-dispersive electron microprobe analysis of a cleaved fiber or of polished drops from the corresponding fiber preform, are set forth in Table I. All dopant levels are given in mole percent.

TABLE I

| Example | | $GeO_2$ | $B_2O_3$ | $P_2O_5$ |
|---|---|---|---|---|
| 1 | Core | 31 | 0 | 0 |
|   | Clad | 3.8 | 9.5 | 0.6 |
| 2 | Core | 6.8 | 6.5 | 1.3 |
|   | Clad | 3.5 | 9.4 | 0.8 |
| 3 | Core | 8.6 | 7.1 | 1.6 |
|   | Clad | 3.7 | 9.0 | 0.8 |
| 4 | Core | 9.0 | 10.7 | 0.7 |
|   | Clad | 3.8 | 8.6 | 0.8 |

Each fiber was hydrogen loaded for about 3 days at 60° C. and 130 atmospheres of hydrogen pressure, and then blanket exposed to radiation from a 248 nm KrF laser operating at 50 Hz. The fluence (expressed in $mJ/cm^2/pulse$) and exposure time for each exposure are listed in Table II. In some cases, two fibers having identical compositions were subjected to different exposure conditions. The refractive index profile of each fiber was measured before and after laser exposure using the near field scan technique. The change in refractivity of the cladding (designated "delta n clad") and the change in refractivity of the core (designated "delta n core"), as well as the ratio of the two values (designated "delta n clad/delta n core"), are reported in Table II. As shown in Table II, each fiber had a core and cladding with substantially matched refractivities, as shown by ratios ranging from 0.55 to 1.31.

TABLE II

| Example | Fluence mJ/cm²/pulse | Exposure min:sec | Delta n Clad | Delta n Core | Delta n clad / Delta n core |
|---------|---------------------|------------------|--------------|--------------|------------------------------|
| 1 | 98 | 9:15 | 0.0063 | 0.0048 | 1.31 |
|   | 151 | 6:00 | 0.0072 | 0.0069 | 1.04 |
| 2 | 105 | 4:42 | 0.0034 | 0.0039 | 0.87 |
| 3 | 174 | 0:56 | 0.0017 | 0.0027 | 0.63 |
|   | 272 | 0:56 | 0.0029 | 0.0035 | 0.83 |
| 4 | 185 | 6:00 | 0.0029 | 0.0053 | 0.55 |

Example 5

An optical fiber having the same composition as the fiber of Example 3 (see Table I) was prepared. The fiber was hydrogen loaded for a period of 4–5 days at 60° C. and 2000 psi hydrogen pressure. Bragg gratings were then written on both the core and cladding using the phase mask method and a KrF excimer laser operating at 50 Hz. The fluence was 174 mJ/cm²/pulse.

The resulting gratings were 3 mm long and unapodized. The saturation peak height was about −43 dB measured as the minimum in the transmission spectrum. The transmission spectrum is a measure of the percentage of incident light transmitted as a function of wavelength. It provides an indirect measurement of the peak in the reflectivity spectrum. The peak width was about 1.6–1.9 nm at −20 dB after a 2 minute exposure time. The wavelength at which maximum reflectivity was achieved was 1554 nm initially. After a 1 minute exposure, it was almost 1558 nm. After 11 minutes of exposure, the wavelength was at 1558 nm and remained there. The change in peak height vs. time is plotted in FIG. 1.

FIG. 1 also includes the results of an SMF-28 optical fiber (Corning Glass), which currently is the industry standard and does not contain boron either in the core or cladding. The process used to write the Bragg gratings on the SMF-28 fiber was identical to the process described above.

The resulting gratings were 3 mm long and unapodized. The saturation peak height was about −43 dB, again measured as the minimum in the transmission spectrum. The peak width was about 0.2 nm at −20 dB after a 2 minute exposure time. The wavelength at which maximum reflectivity was achieved was 1554 nm initially and reached 1555.5 nm after an 11 minute exposure. The change in peak height vs. time is also plotted in FIG. 1. As shown in FIG. 1, the boron-doped fiber exhibited a faster writing speed (as indicated by the amount of time needed to achieve the saturation peak height) than the SMF-28 fiber.

Other embodiments are within the following claims.

What is claimed is:

1. A single-mode optical fiber comprising:
   (a) a core comprising silica, said core characterized by a first refractivity that changes upon exposure to actinic radiation of a predetermined wavelength; and
   (b) a cladding surrounding said core comprising silica, said cladding characterized by a second refractivity different from said first refractivity that changes upon exposure to actinic radiation of a predetermined wavelength,
   wherein at least one of said core and said cladding further comprises boron,
   the relative amounts of boron in said core and said cladding being selected such that said first refractivity and said second refractivity change by substantially the same amount upon exposure to actinic radiation of a predetermined wavelength.

2. An optical fiber according to claim 1 wherein said actinic radiation is ultraviolet radiation.

3. An optical fiber according to claim 1 wherein said core further comprises boron.

4. An optical fiber according to claim 1 wherein said cladding further comprises boron.

5. An optical fiber according to claim 1 wherein said core and said cladding each further comprise boron.

6. An optical fiber according to claim 1 wherein said core further comprises germanium, phosphorus, or a combination thereof.

7. An optical fiber according to claim 1 wherein said cladding further comprises germanium, phosphorus, or a combination thereof.

8. An optical fiber according to claim 1 wherein the ratio of the refractivity change in said cladding to the refractivity change in said core ranges from about 0.5 to about 1.5.

9. An optical fiber according to claim 1 wherein the ratio of the refractivity change in said cladding to the refractivity change in said core ranges from about 0.8 to about 1.1.

10. An optical fiber according to claim 3 wherein said core comprises boron in a concentration ranging from about 3–10 mole %.

11. An optical fiber according to claim 4 wherein said cladding comprises boron in a concentration ranging from about 3–15 mole %.

12. An optical fiber according to claim 1 having a mode field diameter of about 8–12 micrometers.

13. An single-mode optical fiber comprising:
   (a) a core comprising silica, said core further comprising a Bragg grating comprising a first repetitive pattern of perturbations in the refractivity of said core along the axial direction of said optical fiber,
   said first repetitive pattern being characterized by an amplitude, a period, and a phase; and
   (b) a cladding surrounding said core comprising silica, said cladding further comprising a Bragg grating comprising a second repetitive pattern of perturbations in the refractivity of said cladding along the axial direction of said optical fiber,
   said second repetitive pattern being characterized by an amplitude, a period, and a phase,
   wherein at least one of said core and said cladding further comprises boron,
   the relative amounts of boron in said core and said cladding being selected such that the amplitude, the period and the phase of said first repetitive pattern in said core are substantially the same as the amplitude, the period and the phase of said second repetitive pattern in said cladding.

14. An optical fiber according to claim 13 wherein said core comprises boron.

15. An optical fiber according to claim 13 wherein said cladding comprises boron.

16. An optical fiber according to claim 13 wherein said core and said cladding each comprise boron.

17. An optical fiber according to claim 13 wherein said core further comprises germanium, phosphorus, or a combination thereof.

18. An optical fiber according to claim 13 wherein said cladding further comprises germanium, phosphorus, or a combination thereof.

19. An optical fiber according to claim 13 wherein said core comprises boron in an amount ranging from about 3–10 mole %.

20. An optical fiber according to claim 13 wherein said cladding comprises boron in an amount ranging from about 3–15 mole %.

21. An optical fiber according to claim 13 wherein said optical fiber has a mode field diameter of about 8–12 micrometers.

22. An optical fiber according to claim 13 wherein said amplitudes of said repetitive patterns in said refractivities of said core and said cladding are greater than about 0.0008.

23. An optical fiber according to claim 13 wherein said Bragg gratings selectively reflect electromagnetic radiation within a reflection band of wavelengths, said reflection band comprising all wavelengths greater than a first limiting wavelength and lower than a second limiting wavelength, wherein:

(a) said first limiting wavelength and said second limiting wavelength differ by at least about 0.5 nanometers, (b) the transmitted optical power of at least one wavelength in said reflection band is at least about 40 dB lower than the optical power transmitted in the light of the corresponding wavelength which is incident on the grating, and (c) the transmitted optical power of all wavelengths in the reflection band is at least about 20 dB lower than the optical power transmitted in the light of the corresponding wavelength which is incident on the grating.

24. An optical fiber according to claim 13 wherein said Bragg gratings selectively reflect electromagnetic radiation within a reflection band of wavelengths, said reflection band comprising all wavelengths greater than a first limiting wavelength and lower than a second limiting wavelength, wherein:

(a) said first limiting wavelength and said second limiting wavelength differ by at least about 0.5 nanometers, (b) the transmitted optical power of at least one wavelength in said reflection band is at least about 10 dB lower than the optical power transmitted in the light of the corresponding wavelength which is incident on the grating, and (c) the transmitted optical power of all wavelengths in the reflection band is at least about 3 dB lower than the optical power transmitted in the light of the corresponding wavelength which is incident on the grating.

25. A method of modifying an optical fiber comprising exposing to actinic radiation of a predetermined wavelength an optical fiber comprising:

(a) a core comprising silica, said core characterized by a first refractivity that changes upon exposure to actinic radiation of a predetermined wavelength; and (b) a cladding surrounding said core comprising silica, said cladding characterized by a second refractivity different from said first refractivity that changes upon exposure to actinic radiation of a predetermined wavelength, wherein at least one of said core and said cladding further comprises boron, to create a Bragg grating in each of said core and said cladding comprising a repetitive pattern of perturbations in the refractivities of said core and said cladding, the relative amounts of boron in said core and cladding being selected such that said first refractivity and said second refractivity change by substantially the same amount upon exposure to said actinic radiation.

26. A method according to claim 25 comprising immersing said optical fiber in a hydrogen atmosphere prior to exposing said optical fiber to said actinic radiation.

27. A method according to claim 25 comprising exposing said optical fiber to said actinic radiation for a period no longer than about one minute.

* * * * *